United States Patent
Voiculescu et al.

[11] Patent Number: 5,369,970
[45] Date of Patent: Dec. 6, 1994

[54] COMPARTMENT LOCK

[75] Inventors: Danut Voiculescu, Cleveland; Mark Banez, Youngstown; L. David Carlo, Valley City, all of Ohio

[73] Assignee: Winner International, Sharon, Pa.

[21] Appl. No.: 8,504

[22] Filed: Jan. 25, 1993

[51] Int. Cl.⁵ .............................. E05B 65/19
[52] U.S. Cl. .............................. 70/240; 70/14; 70/49; 70/163; 292/DIG. 14; 292/DIG. 69
[58] Field of Search ........ 70/14, 30, 49, 63, 158-164, 70/240; 292/DIG. 14, DIG. 69, DIG. 42, 43; 248/499, 500

[56] References Cited

U.S. PATENT DOCUMENTS

| | | | |
|---|---|---|---|
| 2,055,906 | 9/1936 | Menchen | 70/164 X |
| 2,294,190 | 8/1942 | Lee | 70/158 X |
| 2,813,620 | 11/1957 | Hansen | 70/63 X |
| 4,033,160 | 7/1977 | Mima | 70/49 X |
| 4,070,880 | 1/1978 | Call | 70/240 |
| 4,086,795 | 5/1978 | Foster et al. | 70/49 X |
| 4,404,822 | 9/1983 | Green | 70/49 X |
| 4,532,783 | 8/1985 | Maurice | 70/162 X |
| 4,674,303 | 6/1987 | Saccone, II | 70/63 |
| 5,144,821 | 9/1992 | Ernesti et al. | 70/14 X |

FOREIGN PATENT DOCUMENTS

| | | | |
|---|---|---|---|
| 619149 | 3/1927 | France | 70/240 |
| 2742467 | 3/1979 | Germany | 70/240 |
| 099843 | 8/1981 | Japan | 70/240 |

Primary Examiner—Peter M. Cuomo
Assistant Examiner—Suzanne L. Dino
Attorney, Agent, or Firm—Vickers, Daniels & Young

[57] ABSTRACT

A device is provided for locking a compartment lid such as the hood of a motor vehicle. The device comprises an element adapted to sit on a portion of the hood and a portion of an adjacent fender surface, a strap attached to the element and extending through a gap between the hood and fender into the compartment interior, a hook on the strap to attach the strap to the vehicle in the compartment, and a mechanism such as a reel to remove slack from the strap and hold the element securely against the hood and adjacent fender surface.

22 Claims, 6 Drawing Sheets

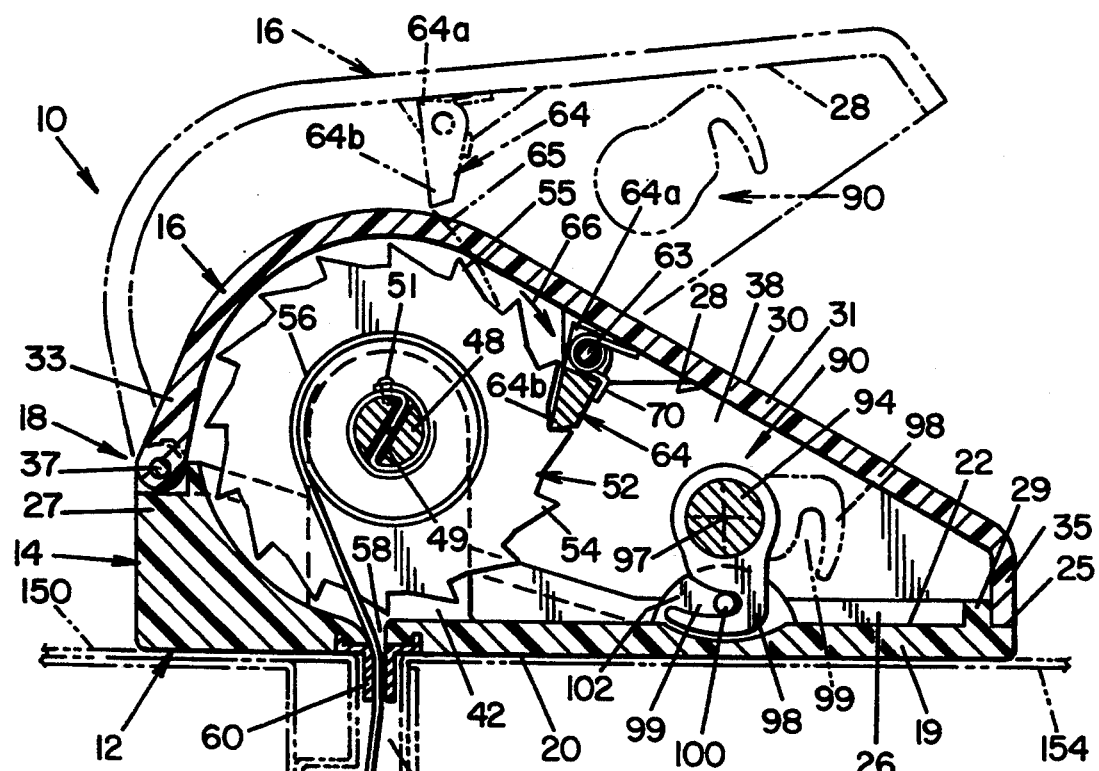
FIG. 1
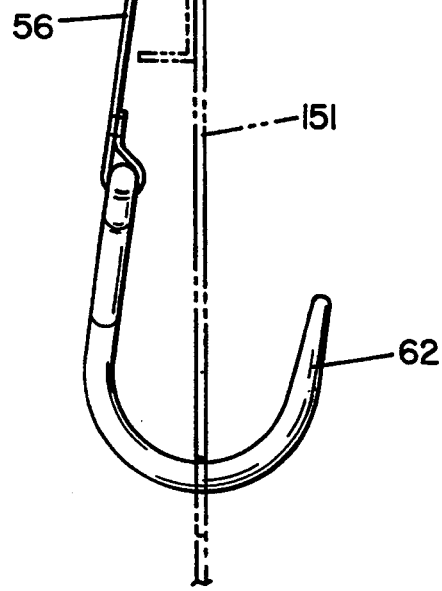

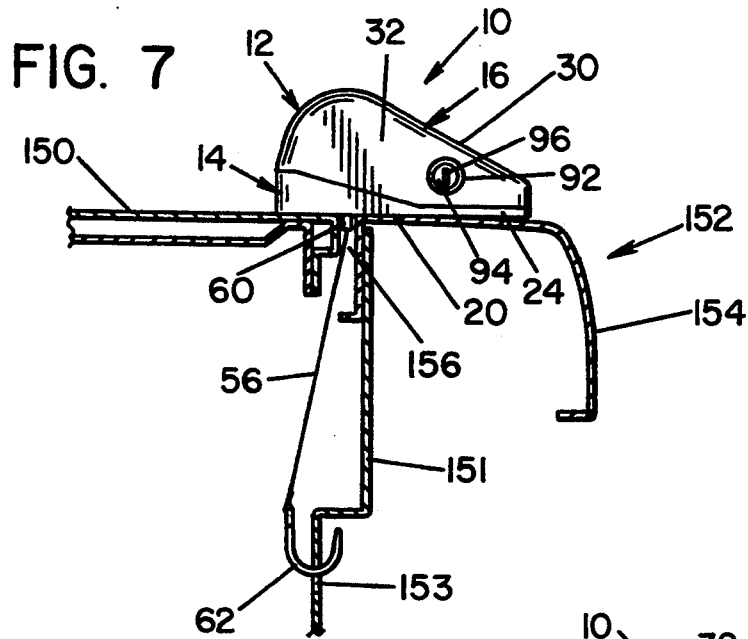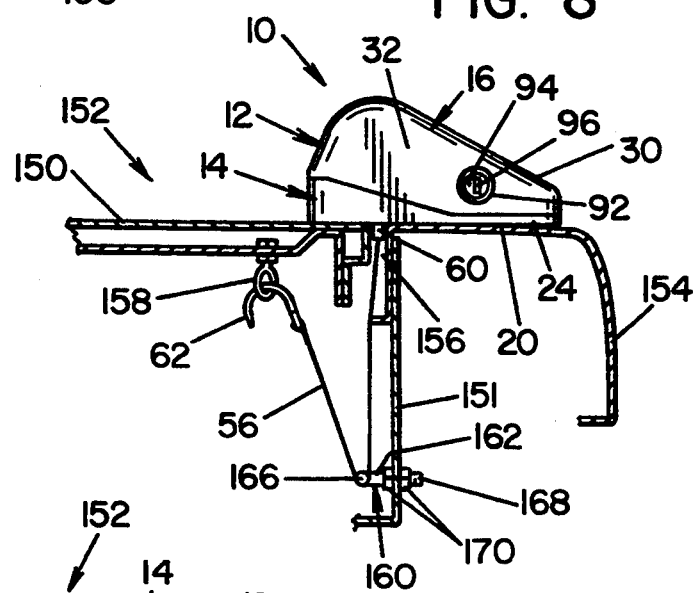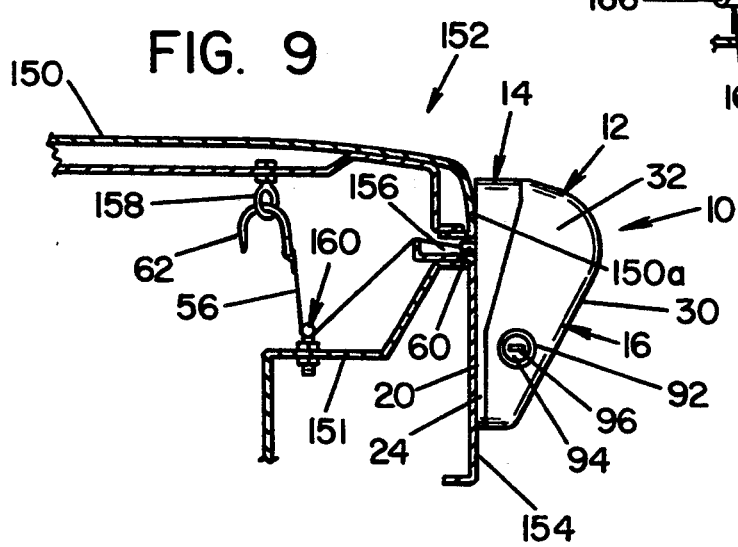

COMPARTMENT LOCK

The present invention relates to a compartment lock and more particularly to a highly visible compartment lock which is portable.

BACKGROUND OF THE INVENTION

The present invention is particularly suited for locking a hood of a vehicle to prevent an unauthorized person from gaining entry to the engine compartment. It will be appreciated, however, that the invention could also be used to secure the trunk or hatchback of a vehicle. It could also be used to lock chests, cabinets, and many other types of compartments. For convenience herein, however, the invention will be described with reference to locking the hood of a vehicle.

A major concern of automobile owners is that their cars will be broken into and stolen or stripped of valuable components such as stereo systems or batteries. This concern has helped create an industry devoted to the manufacture of various kinds of anti-theft devices. These devices include car alarms, steering wheel locks, and devices designed to temporarily disable ignition systems and other vital components of a vehicle. None of these devices is perfect, however, and car theft, as well as the theft of accessories from cars, remains a concern in this country and others.

Devices such as car alarms are designed to frighten away thieves who have begun to tamper with a vehicle. Any disturbance to the vehicle results in piercing sirens, horns, and sometimes flashing lights. However, as car alarms have proliferated, so has the unintended activation thereof. False alarms are so common in some areas, especially in cities, that these alarms are often ignored. Thieves may be emboldened by the knowledge that few people are likely to rush to investigate a blaring car alarm, and may be able to remove items from the vehicle even if unable to drive it away with the alarm sounding.

Furthermore, a thief may not discover a car alarm until after he has smashed a window or discover an ignition-locking device until after he has stripped the steering column. Clearly, even an attempted theft can cause a great deal of costly damage.

Highly visible anti-theft devices, such as steering wheel locks, not only help to prevent car thefts, but also deter attempts to steal a vehicle. Thieves seeing a vehicle equipped with an obvious anti-theft device are likely to search for an easier target. Visible anti-theft devices thus are useful in preventing the damage associated with attempted vehicular theft.

Steering wheel locks, however, do nothing to prevent the theft of items within a vehicle or to prevent a thief from prying open a hood, trunk or hatchback to steal the battery, engine parts, spare tire or other objects therein. Nor do they prevent a person who has gained entry to a vehicle from opening the hood and tampering with the engine or stealing the battery. Additionally, even car alarms may be disabled if a thief opens the hood and cuts off the power supply to the alarm. A thief who can open a car hood can thus steal the battery, tamper with the engine, or disable an alarm system and steal the vehicle.

SUMMARY OF THE INVENTION

To overcome these problems, the subject invention is directed toward a highly visible compartment lock. Such a lock can be used to make any compartment such as a car trunk or hatchback more difficult to open. The compartment lock comprises an element adapted to sit over a portion of a hood, a portion of a panel adjacent the hood such as a fender, and the gap therebetween. The device further includes a strap attached to the element which extends through the gap between the hood and fender and is selectively attachable to a structure in the engine compartment area. The strap may comprise a wide, thin band of woven nylon or metal, a metal cable or any other material which is strong enough to secure the lock to a vehicle. As used herein, "strap" is meant to include all of these possibilities. The strap may include a hook on one end which can be attached to part of the automobile frame or to a battery support mounting bracket. A mechanism is included for removing the slack from the strap so that the element is held securely against the hood and fender.

To use the lock, the hood is opened and the strap is secured to the vehicle frame or other sturdy structure with a hook or other attachment device. The element is held outside of the engine compartment and the hood is closed so that the strap passes through the gap between the hood and fender. The slack is then removed from the strap, such as by winding the strap onto a reel located within the element, which may comprise a hollow case, until the element is held firmly against the hood and fender. The strap is thus secured in such a way that the element cannot be removed from the hood and fender until released by the vehicle owner. In this manner, the hood is securely held down and will not open even if the vehicle's hood release is pulled. Furthermore, the strap is protected by the element making it difficult to cut. The subject device is removed by releasing the mechanism which secures the strap, pulling the device away from the vehicle, opening the hood, and detaching the strap from the interior of the engine compartment. The device may be used on any vehicle and is small enough that a vehicle to which it is attached may be driven with the device in place. The device will also be readily noticed by potential thieves who will probably avoid the protected vehicle in search of an easier target.

It is therefore a primary object of the present invention to provide a compartment lock which will prevent the unwanted opening of a compartment cover.

It is another object of the present invention to provide a compartment lock which will deter thieves from attempting to open a compartment to which it is attached.

It is yet a further object of the present invention to provide an anti-theft device which can be used either alone or as a complement to other vehicular security devices.

It is a further object of the present invention to provide a highly visible vehicular compartment lock.

It is still a further object of the present invention to provide a compartment lock which can be used to secure the hood of a motor vehicle.

It is another object of the present invention to provide a hood lock which is portable.

It is yet a further object of the present invention to provide a hood lock which is structurally simple and economical to produce.

It is yet another object of the present invention to provide a hood lock which may be quickly and easily attached and removed by the vehicle owner.

It is still another object of the present invention to provide a vehicular hood lock which can be used with many types of vehicles.

BRIEF DESCRIPTION OF THE DRAWINGS

The foregoing and other objects and advantages of the invention will become apparent from the following detailed description when read in conjunction with the accompanying drawings in which:

FIG. 1 is a sectional elevation view of a compartment lock according to the present invention;

FIG. 7 is an elevation view of the compartment lock of FIGS. 1-3 and shows one manner of attaching the lock to a vehicle;

FIG. 8 is an elevation view of the compartment lock of FIGS. 1-3 and shows an alternate manner of attaching the lock to the vehicle; and, FIG. 9 is an elevation view of the compartment lock of FIGS. 1-3 and shows yet another manner of attaching the device to a vehicle.

DETAILED DESCRIPTION OF PREFERRED EMBODIMENTS

Figure 2:
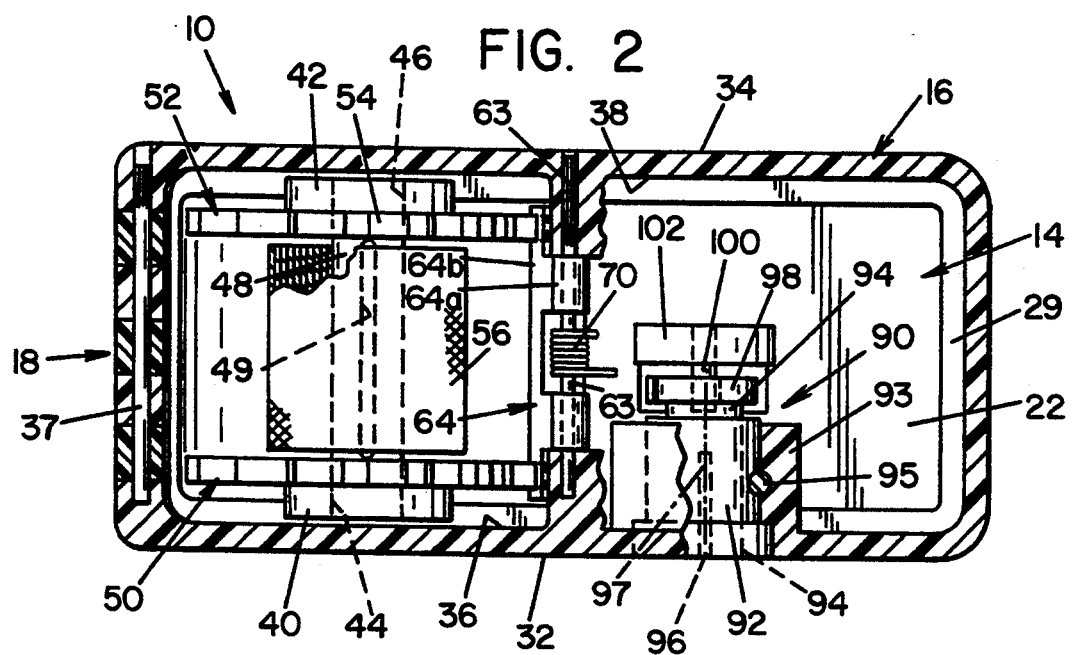
FIG. 2 is a plan view, partially in section of the compartment lock show in FIG. 1.
Figure 3:
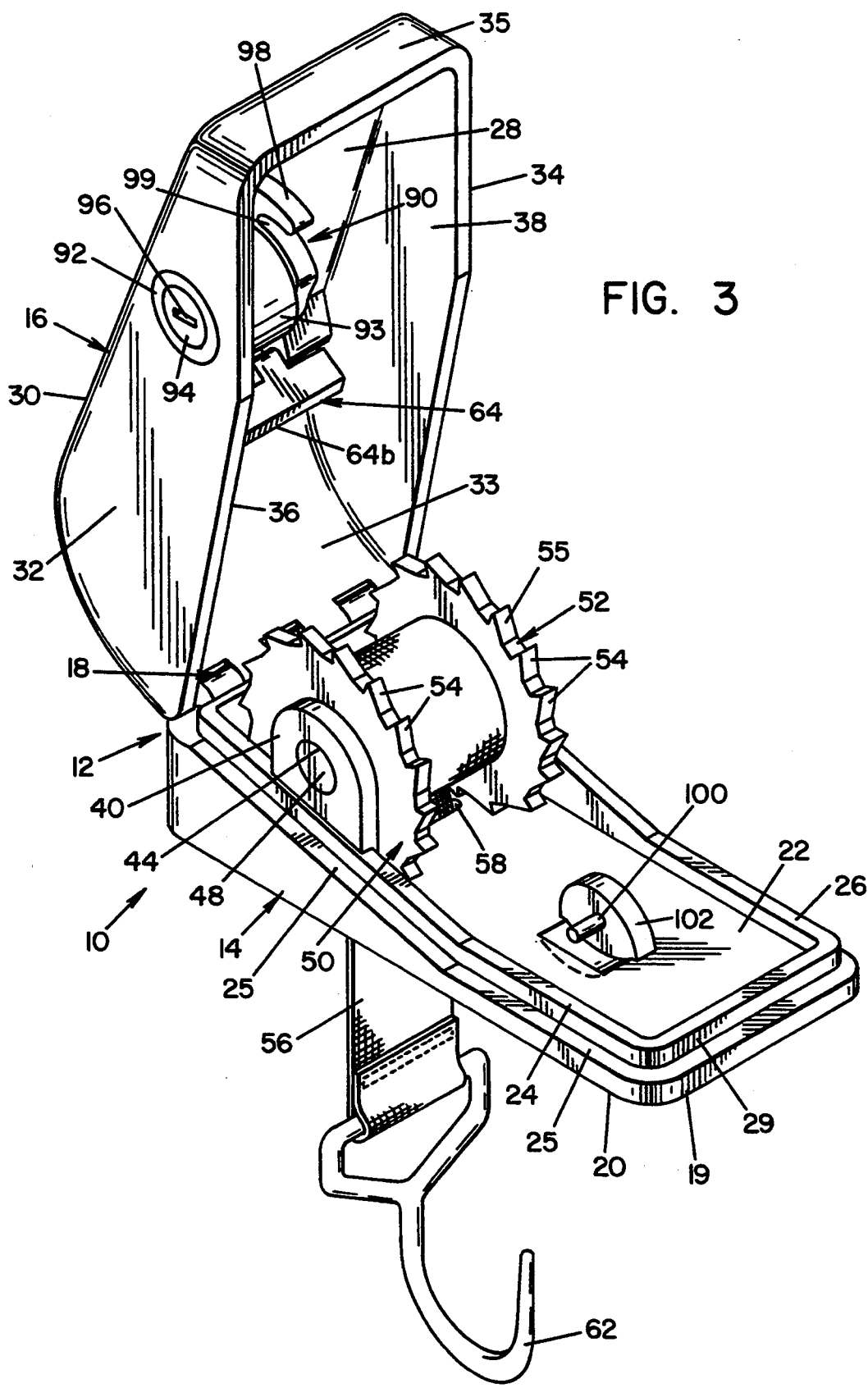
FIG. 3 Is a perspective view of the compartment lock opened to reveal the interior thereof.

Reference is now made to the drawings wherein the showings are for the purpose of illustrating preferred embodiments of the invention only and not for the purpose of limiting the same. FIGS. 1-3 show an anti-theft device 10 comprising a case 12, preferably of plastic material, having a bottom 14 and a top 16 connected by a hinge 18. The case bottom 14 includes a bottom wall 19, side walls 24 and 26, and end walls 27 and 29. The side and end walls are contoured and associated with bottom wall 19 so as to provide a ledge 25 extending about the periphery of case bottom 14. The bottom wall 19 further includes a bottom surface 20 and a top surface 22. The case top 16 comprises a top wall 31 having a top surface 30 and side walls 32, 34. Side wall 32 includes an inner side surface 36 and side wall 34 includes an inner side surface 38. End walls 27 and 33 are notched so as to interleave and are apertured to receive pin 37 thus to define hinge 18. The side and end walls of case top 16 engage ledge 25 when the case top 16 is closed. The ledge braces case top 16 and prevents lateral displacement between case bottom 14 and case top 16. Moreover, the ledge also makes it more difficult to drive a wedge between case bottom 14 and case top 16.

Two supports 40, 42 are attached to the top surface 22 of the case bottom 14 and to side walls 24 and 26, respectively. Support 40 includes an opening 44 and support 42 includes an opening 46. The openings 44, 46 are adapted to rotatably support an axle 48 having an opening 49 therethrough as seen in FIGS. 1-2. Two ratchet wheels 50, 52 having ratchet teeth 54 are mounted on axle 48, one adjacent each support 40, 42. A strap 56 is attached to the axle 48 in such a way that when the axle 48 is rotated in a clockwise direction as shown in FIG. 1 the strap 56 will become wound around the axle 48. This may be accomplished by passing one end of the strap 56 through the opening 49 in the axle 48 and attaching strap 56 to the axle 48 with at least one rivet 51. The strap 56 extends from the axle 48 through an opening 58 in bottom wall 19. This opening 58 is surrounded by a guard 60, preferably of cut-resistant metal, which is attached to the bottom wall 19 of the case bottom 14 such as by embedment therein and extends downward from bottom surface 20 thereof. Alternately, the guard 60 may be formed as an integral part of the case bottom 14. A hook 62 is attached to the outer end of the strap 56. Thus, it can be seen from FIG. 1 that when the strap 56 depends from the axle 48 through the opening 58, the hook 62 can be raised by turning the ratchet wheels 50, 52 in a clockwise direction and lowered by turning the ratchet wheels 50, 52 in a counter-clockwise direction.

A pawl 64 is pivotably attached to the inner surface 28 of top wall 31 of the case top 16 by means of a pin 63. The pawl is biased counterclockwise in FIG. 1 against ratchet teeth 54 by a torsion spring 70 having its opposite ends, not designated numerically, respectively engaging the pawl and inner surface 28 of top wall 31. Counterclockwise rotation of pawl 64 is limited by engagement of corner 64a thereof with inner surface 28, as will be appreciated from FIG. 1. As will be further appreciated from FIG. 2, pawl 64 has a width between inner surfaces 36 and 38 of walls 32 and 34 such that the laterally outer ends of the pawl are positioned to engage ratchet teeth 54. When the case 12 is opened, the pawl 64 is not engaged with the teeth 54 of the ratchet wheels 50, 52 as shown by the broken line position of top 16 in FIG. 1. In this configuration, wheels 50, 52 may be rotated in either direction. As the case top 16 is pivoted clockwise in FIG. 1 about the hinge pin 37 toward the case bottom 14, the nose 64b of pawl 64 moves along path 65 toward ratchet teeth 54. Pivoting the case top 16 about the hinge pin after the pawl 64 has engaged one of the ratchet teeth 54 moves pawl 64 toward bottom wall 19 thereby turning the ratchet wheels 50, 52 in a clockwise direction 66 and winding part of the strap 56 onto the axle 48. When the pawl 64 is engaged with the ratchet teeth 54, the ratchet wheels 50, 52 are prevented from rotating in a counterclockwise direction relative to the pawl 64 as seen in FIG. 1. Spring 70 holds pawl 64 against ratchet teeth 54 but is not strong enough to rotate ratchet wheels 50, 52 when case top 16 is pivoted in the counterclockwise direction. Thus, when case top 16 is pivoted in the counterclockwise direction to open the case 12, biasing spring 70 allows the pawl 64 to slide over the slanted surfaces 55 of the ratchet teeth without rotating the ratchet wheels 50, 52 counter-clockwise. Thus, it can be seen that any amount of the strap 56 can be wound onto the axle 48 by repeatedly pivoting the case top 16 in opposite directions about the hinge pin. When the case 12 is closed, the pawl 64 is engaged with the ratchet teeth 54 and the strap 56 cannot be unwound from the axle 48.

The device also includes a lock mechanism designated generally by reference numeral 90. The lock mechanism 90 comprises a lock cylinder 92 received in cylinder support sleeve 93 which projects into the interior of case 12 from the inner side surface 36 of side wall 32. A locking pin 95 serves to hold cylinder 92 in place in sleeve 93. The outer end of cylinder 92 is coplanar with the outer surface of side wall 32 of the cover top 16. The lock cylinder includes a tumbler 94 having a keyhole 96 extending into the tumbler. An arm 98 is attached to the inner end of tumbler 94 and rotates about the tumbler axis 97 when a key (not shown) is inserted in keyhole 96 and turned. When the tumbler is turned clockwise in FIG. 1, opening 99 in the arm 98 engages about a rod 100 which is attached to a support 102 mounted on or integral with bottom wall 19 of case bottom 14. In this position, the case top 16 and case bottom 14 are locked together and the pawl 64 prevents the ratchet wheels 50, 52 from rotating so as to unwind the strap 56 from the axle 48. Counterclockwise rotation of tumbler 94 disengages arm opening 99 and rod 100 to unlock top 16 for displacement relative to bottom 14.

Figure 6:
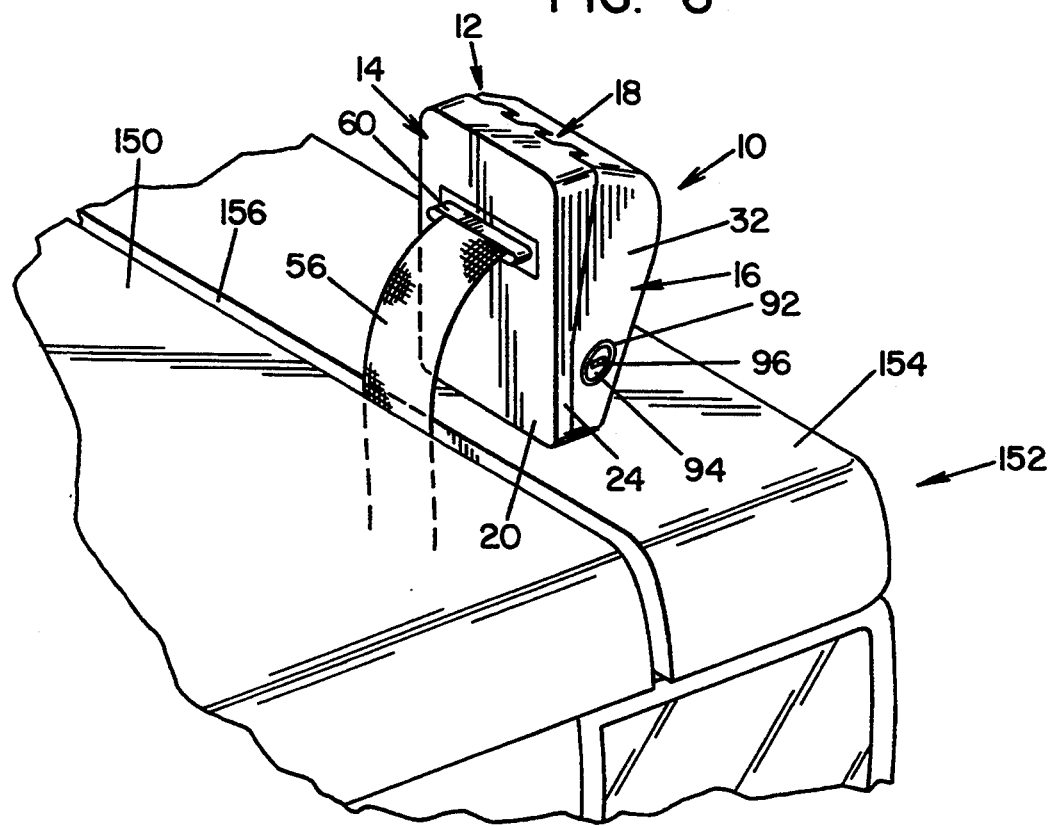
FIG. 6 is a perspective view of the compartment lock of FIGS. 1-3 shown in the process of being attached to the hood of a vehicle.

FIG. 6 shows the anti-theft device 10 being attached to the hood 150 of a vehicle 152, having a fender 154 adjacent to the hood 150 and a gap 156 between the fender 154 and the hood 150. When fully attached, the device 10 and the interior of the engine compartment are as shown in FIG. 7. To attach the device 10, the hood 150 of the vehicle 152 is opened and the hook 62 is attached to any suitable object in the engine compartment area such as an opening 153 in a component 151 of the vehicle's chassis or a mounting bracket for a battery support. The object to which the hook is attached should be sturdy enough to withstand the tugging of a thief trying to open the hood without breaking or being damaged. Furthermore, the object to which the hook is attached should not move when the motor is started. The strap 56 is unwound from the axle 48, hook 62 is engaged in an opening 153 in component 151, and the device 10 is positioned above the fender 154 as shown in FIG. 6. The hood 150 is then closed so that the strap 56 passes through the gap 156 between the hood 150 and the fender 154. The strap 56 is then wound onto the axle 48 by pivoting the case top 16 about pin 37 of the hinge 18 so that the pawl 64 engages and turns the ratchet wheels 50, 52 as described above. As the strap 56 is reeled into the case 12 the device 10 is pulled toward the hood 150 and the fender 154. The guard 60 fits into the gap 156 when the device 10 rests on the hood 150, fender 154 and gap 156 therebetween. The guard 60 makes it difficult to cut the strap 56 when the device 10 is in place. The strap 56 is wound onto the axle 48 until the bottom surface 20 of the case bottom 14 is firmly held against the vehicle 152 by the tension in strap 56. The case 12 is then locked. In this configuration, the hood 150 cannot be raised.

To remove the anti-theft device 10, the case 12 is unlocked and the case top 16 is pivoted about the hinge 18 until the pawl 64 disengages from the ratchet teeth 54. The strap 56 can then be unwound from the axle 48 by pulling the device 10 away from the vehicle 152. In this configuration, the hood 150 can be opened and the hook 62 removed.

Figure 5:
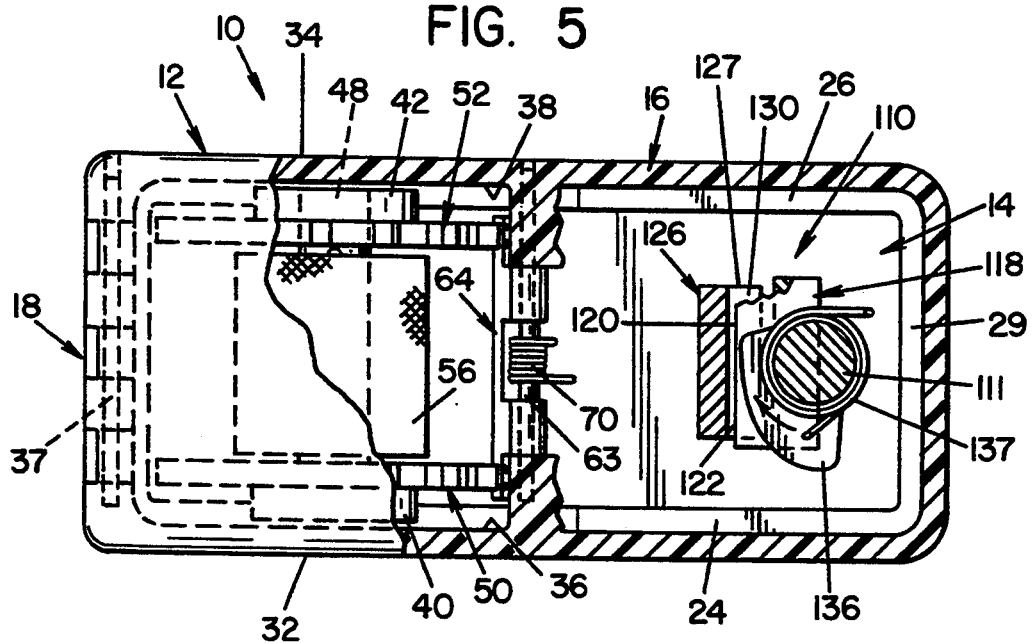
FIG. 5 is a plan view, partially in section, of the embodiment shown in FIG. 4.
Figure 4:
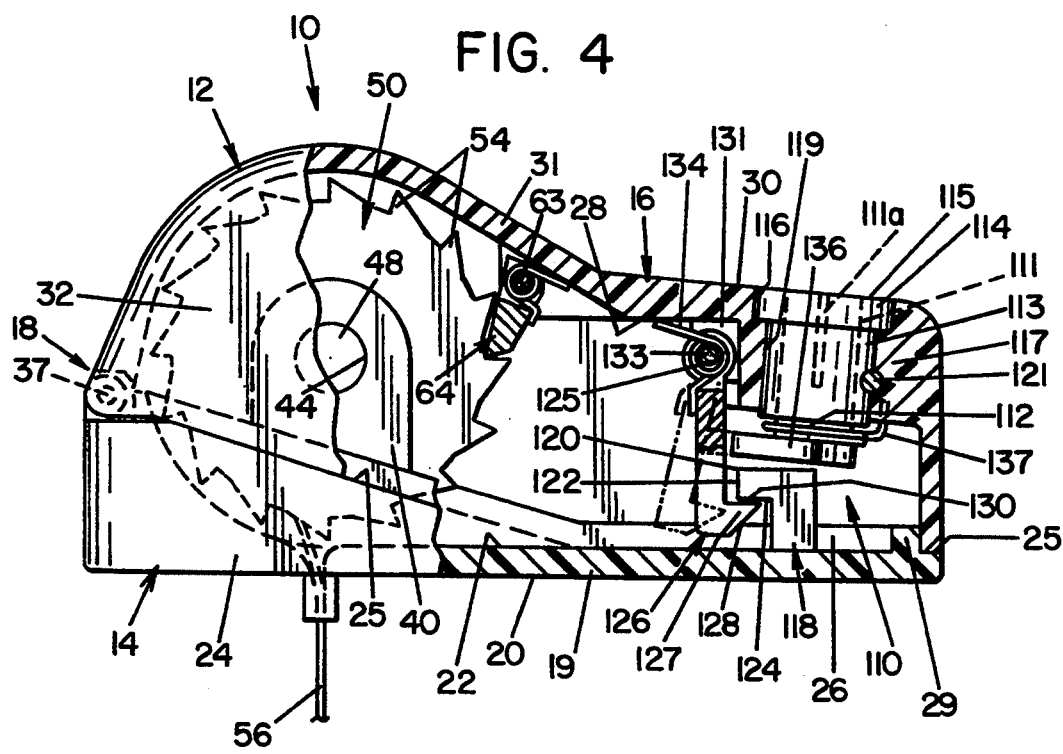
FIG. 4 is an elevation view, partially in section, of another embodiment of a compartment lock according to the present invention.

An alternate locking mechanism 110 is shown in FIGS. 4 and 5 with elements common to FIGS. 1-3 identified by the same reference numerals. In this embodiment, the locking mechanism 110 comprises a lock cylinder 112 rotatably supporting a tumbler 111 having a keyhole 111a. Cylinder 112 includes a body portion 113 and a flange 114 at the upper end thereof. An opening 116 in the top wall 31 of the case top 16 is large enough to accommodate flange 114 so that the top surface 115 of cylinder 112 is flush with the outer top surface 30 of case top 12. A cylinder support 117, which projects downwardly from the inner surface 28 of top wall 31, is provided with a bore 119 large enough to accommodate cylinder body 113 but having a diameter less than the diameter of the flange 114. Thus, cylinder support 117 prevents cylinder 112 from dropping into the interior of case 12 and a locking pin 121 is provided to hold cylinder 112 in place against removal from top 16. For the purpose set forth hereinafter, a cam 136 is attached to the tumbler in cylinder 112 and is adapted to turn when the cylinder 112 is turned with a key (not shown).

The lock mechanism 110 further comprises a latch keeper 118 mounted on or integral with the top surface 22 of the bottom wall 19. Keeper 118 is in the shape of an inverted "L" having a top corner 120, a side surface 122 and keeper surface 124. A latch member 126 on top 16 is generally "L" shaped and has a slanted side 128 and a latch surface 130 providing a latch nose 127 adapted to engage under keeper surface 124 as set forth hereinafter. The latch member 126, which includes a bore 125, is pivotably mounted between two latch supports 131, only one of which is shown in FIG. 4, on an axle 133 attached therebetween. The latch supports 131 depend from the inner surface 28 of top wall 19. The latch member 126 is biased counterclockwise in FIG. 4 by a torsion spring 134 toward a first position shown by solid lines in FIG. 4 and in which latch member 126 is approximately perpendicular to the surface 28 of top wall 19. When case 12 is closed, torsion spring 134 holds latch member 126 in the first position whereby latch nose 127 of the latch member is beneath latch keeper surface 124 thereby locking the case 12. To unlock the case, tumbler 111 is turned by means of a key, whereby cam 136 on the inner end of the tumbler is rotated clockwise from the position thereof shown in FIG. 5. This displaces latch member 126 clockwise in FIG. 4 to a second position, shown by broken lines, so that the nose 127 of latch member 126 is no longer beneath latch keeper surface 124. This allows case 12 to be opened. Cam 136 is then returned to its initial position shown in FIG. 5 so that latch member 126 can return to its first position under the force of spring 134. Preferably, a torsion spring 137 is provided to assist in returning cam 136 to its initial position. When latch member 126 is in its first position, and case 12 is open, case 12 can locked without using a key. In this respect, case 12 is locked by pushing the case top 16 against the case bottom 14. This causes the slanted side 128 of the latch member 126 to contact the top corner 120 of the latch keeper 118. As more pressure is applied to the case top 16, the latch member 126 pivots away from the latch keeper 118 in a clockwise direction as the slanted side 128 slides over the top corner 120. When the latch nose 127 of the latch member 126 has moved past the side surface 122 of the latch keeper 118, the torsion spring 134 forces the latch nose 127 beneath the keeper surface 124 thereby locking the case 12. In this manner, the device 10 may be quickly locked without using a key.

FIG. 8 shows an alternate method of attaching the device 10 to the vehicle 152. Instead of attaching the hook 62 directly to chassis component 151 of the vehicle 152, the hook 62 may be attached to a ring 158 mounted on the underside of the hood 150. In this configuration, a "U"-shaped member 160 is also employed to redirect strap 56 upwardly toward the hood. The U-shaped member 160 includes a pair of legs 162 connected by a bight 166. U-shaped member 160 is depicted in section in FIGS. 8 and 9 and, therefore, only one leg 162 is visible. Legs 162 include threaded portions 168 which are adapted to pass through openings therefore in chassis component 151 (not shown) and which are secured by nuts 170. In this manner, bight 166 is spaced from chassis component 151 a sufficient distance for hook 62 and strap 56 to be passed through the space defined by legs 162, bight 166 and chassis component 151 before being attached to hook 158. When the strap 56 is wound onto the axle 48 and the bottom surface 20 of the device 10 is firmly held against the vehicle 152 by the tension in the strap 56, the hood 150 cannot be opened. By redirecting straps 56 through the use of member 160, the holding force on the hood is directed downwardly thus to optimize the direction of force application.

FIG. 9 shows the device 10 being used with a vehicle having a different hood configuration. In this instance, fender 154 is vertical and hood 150 has a vertical portion 150a thereabove. When gap 156 is located between the vertical surfaces of hood 150 and fender 154, U-shaped member 160 is again useful to redirect strap 56 so as to apply the holding force on the hood downwardly.

Preferably, as will be appreciated from FIGS. 7-9, all exposed parts of the strap 56 remain near the underside of the hood 150. This makes the strap 56 difficult for a thief to access from beneath the vehicle 152. At the same time, guard 60 makes strap 56 difficult to cut or otherwise access from the top of the vehicle.

Figure 11:
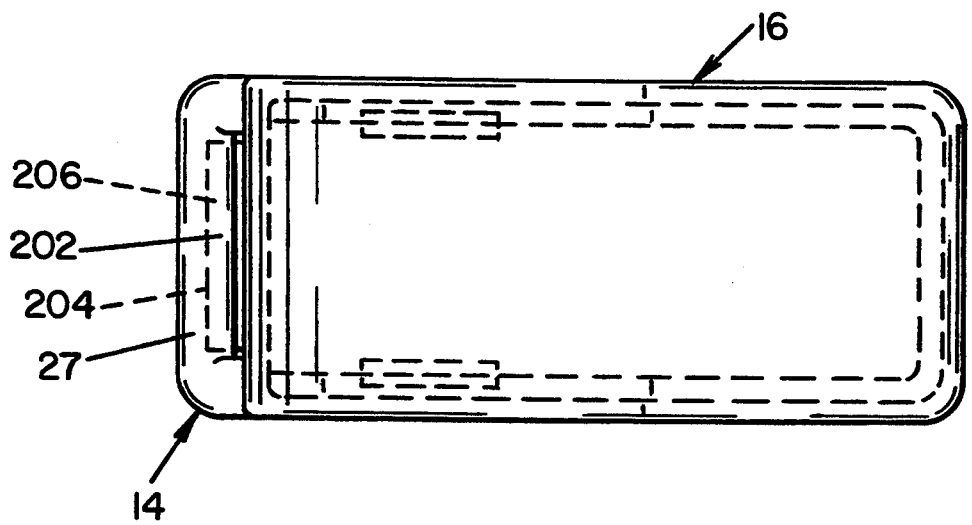
FIG. 11 is a plan view of the compartment lock shown in FIG. 10.
Figure 10:
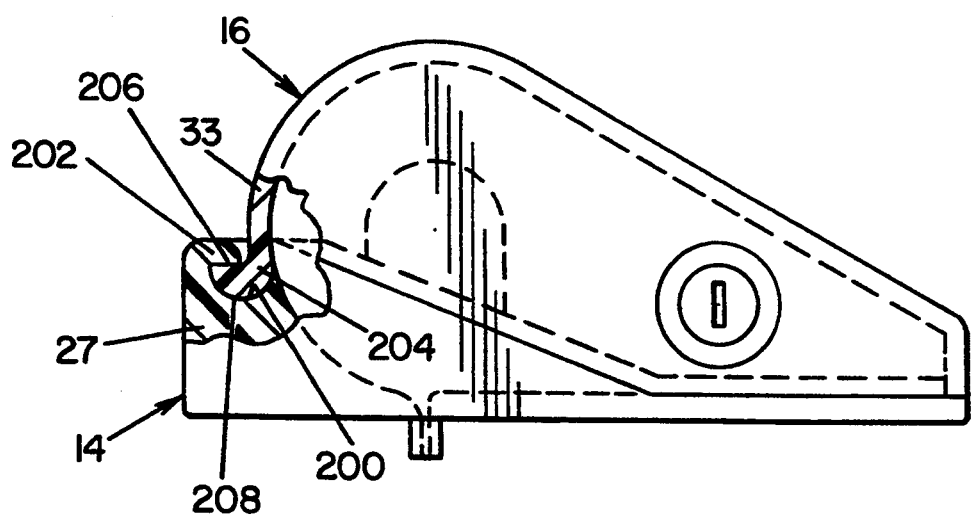
FIG. 10 is an elevation view, partially in section, of another embodiment of the case for a compartment lock according to the present invention.

In an alternate embodiment of the case shown in FIGS. 10 and 11, wherein elements common to FIGS. 1-9 are designatedly common reference numerals, top 16 is pivotably mounted on bottom 14 without using a hinge pin. This construction results in a secure device which is simple to fabricate and assemble. End wall 27 of bottom 14 includes a rounded trough 200 therein which is partially disposed beneath a lip 202 formed from end wall 27. End wall 33 of top 16 includes a rocker element 204 having a flat surface 206 and a rounded surface 208 adapted to fit within trough 200. When case 12 is closed, lip 202 and trough 200 retain rocker element 204 and prevent top 16 from being separated from bottom 14. When top 16 is pivoted in the counterclockwise direction in FIG. 10, trough 200 supports and retains rocker element 204 as it turns in trough 200. Thus top 16 can be rocked back and forth on rocker 204 in trough 200 in much the same manner as it can be pivoted about the hinge pin in the first embodiment and to the same end.

The invention has been described with reference to preferred embodiments. It will be appreciated that modifications or alterations can be made without deviating from the principles of the present invention. For example, the ratchet wheels and axle could be rotated by using a lockable crank which is accessible from the outside of the case. Also, the hook on the end of the strap could be replaced with a ring, or other connecting device adapted to secure the strap to the vehicle. Such modifications and alterations will occur to others upon a reading and understanding of the specification. It is intended that all such modifications and alterations be included insofar as they come within the scope of the appended claims or the equivalents thereof.

I claim:

1. A device for locking a cover for a compartment relative to a fixed surface, said cover and fixed surface having adjacent spaced apart portions having outer and inner sides relative to said compartment, said device comprising:

support means adapted to sit on said outer sides of said portions of said cover and said surface over the space therebetween, said support means comprising a bottom portion and a top portion pivotably connected to said bottom portion by hinge means for pivotable movement toward and away from said bottom portion about a horizontal axis in a plane normal to said bottom portion;

strap means attached to said support means and adapted to pass through said space into said compartment, said strap means having an end spaced from said support means, means for attaching said end of said strap means within said compartment; and, tensioning means including means on said top portion for tensioning said strap means to hold said support means against said outer sides of said portions of said cover and said surface when said top portion is pivoted toward said bottom portion and for releasing said tension when said top portion is pivoted away from said bottom portion.

2. A device according to claim 1, wherein said tensioning means comprises reel means on which said strap is wound, said reel means being rotatable about a reel axis parallel to said horizontal axis and including ratchet means having teeth, and said means on said top portion comprising a pawl attached to said top portion and adapted to engage said teeth and rotate said reel means when said top portion is pivoted toward said bottom portion.

3. A device according to claim 2, including locking means for locking said top portion to said bottom portion, said pawl adapted to engage said teeth to hold said reel means against rotation when said top portion is locked to said bottom portion.

4. A device according to claim 2, wherein said reel means is supported on said bottom portion and said bottom portion includes an opening therethrough, said strap means extending through said opening.

5. A device according to claim 4, wherein said reel means includes at least one ratchet wheel having teeth, said top portion being pivotal between open and closed positions relative to said bottom portion, said pawl engaging said teeth to rotate said reel means in a winding direction when said top portion is pivoted from said open position toward said closed position, and said pawl engaging said teeth in said closed position to lock said reel means against rotation in an unwinding direction.

6. A device according to claim 5, wherein said pawl is pivotably mounted on said top portion, spring means biasing said pawl toward an engaging position in which said pawl engages said teeth to rotate said at least one ratchet wheel in said winding direction when said cover portion is pivoted from said open to said closed position, and said pawl being pivotably displaced with said cover portion to a disengaged position relative to said teeth when said cover portion is pivoted from said closed to said open position.

7. A device according to claim 3, wherein said reel means is supported on said bottom portion and said bottom portion includes an opening therethrough, said strap means extending through said opening.

8. A device according to claim 6 and means for locking said top portion in said closed position relative to said bottom portion.

9. A device according to claim 7, wherein said lock means comprises:
   tumbler means mounted on said top and rotatable between a locking and unlocking position;
   attachment means mounted on said bottom;
   clasp means mounted on said tumbler means for rotation therewith, said clasp means engaging said attachment means when said tumbler means is in said locking position and disengaging said attachment means when said tumbler means is in said unlocking position.

10. A device according to claim 3, wherein said means for locking said cover portion comprises key operated lock means attached to said cover portion and retaining means mounted on said bottom portion, said lock means having a locked position and an unlocked position and including latch means to respectively engage and disengage said retaining means when said lock means is in said locked and unlocked positions.

11. A device according to claim 10, wherein said latch means includes a latch member mounted on said cover portion to pivot between engaged and disengaged positions relative to said retaining means; spring means biasing said latch member toward said engaged position; said retaining means being a latch keeper mounted on said bottom portion to receive said latch member in said engaged position thereof; said lock means including tumbler means rotatable between a locking and unlocking position corresponding to said locked and unlocked positions; spring means biasing said tumbler means toward said locking position; and a cam attached to said tumbler means for rotation therewith, said cam displacing said latch member from said engaged position to said disengaged position relative to said retaining means when said tumbler means is rotated from said locking position to said unlocking position.

12. A device for locking a cover for a compartment relative to a fixed surface, said cover and fixed surface having adjacent spaced apart portions having outer and inner sides relative to said compartment, said device comprising:
   support means adapted to sit on said outer sides of said portions of said cover and said surface over the space therebetween, said support means comprising a bottom portion having an opening therethrough and a top portion pivotably connected to said bottom portion by hinge means, said bottom portion including guard means surrounding said opening, said guard means extending into said space when said support means rests on said cover and said surface;
   strap means attached to said support means and adapted to pass through said opening and through said space into said compartment, said strap means having an end spaced from said support means;
   means for attaching said end of said strap means within said compartment; and,
   means for tensioning said strap means to hold said support means against said outer sides of said portions of said cover and said surface.

13. A device according to claim 12, wherein said hinge means comprises rocker means attached to said top portion and a recess in said bottom portion adapted to guide and support said rocker means for pivotable displacement therein.

14. A device for locking a cover for a compartment relative to a fixed surface, said cover and fixed surface having adjacent spaced apart portions having outer and inner sides relative to said compartment, said device comprising:
   support means adapted to sit on said outer sides of said portions of said cover and said surface over the space therebetween, said support means comprising a bottom portion having an opening therethrough and a top portion pivotably connected to said bottom portion by hinge means;
   strap means attached to said support means and adapted to pass through said space into said compartment, said strap means having an end spaced from said support means;
   means for attaching said end of said strap means within said compartment;
   tensioning means for tensioning said strap means to hold said support means against said outer sides of said portions of said cover and surface, said tensioning means comprising reel means on which said strap means is wound supported on said bottom portion of said support means for rotation in winding and unwinding directions with respect to said strap means, said strap means extending through said opening in said bottom portion;
   means for rotating said reel means in said winding direction; and,
   means for locking said reel means against rotation in said unwinding direction;
   wherein said bottom portion includes guard means surrounding said opening and said strap means extending therethrough, said guard means extending into said space when said support means rests on said cover and said surface.

15. A device for locking a cover for a compartment relative to a fixed surfacer said cover and fixed surface having adjacent spaced apart portions having outer and inner sides relative to said compartment, said device comprising:
   support means adapted to sit on said outer sides of said portions of said cover and said surface over the space therebetween, said support means comprising a bottom portion and a top portion pivotably connected to said bottom portion by hinge means;
   strap means attached to said support means and adapted to pass through said space into said compartment, said strap means having an end spaced from said support means;
   means for attaching said end of said strap means within said compartment;
   tensioning means for tensioning said strap means to hold said support means against said outer sides of said portions of said cover and surface, said tensioning means comprising reel means, said reel means including at least one ratchet reel having teeth, said reel means on which said strap means is wound being supported on said bottom portion of said support means for rotation in winding and unwinding directions with respect to said strap means, said bottom portion including an opening therethrough, said strap means extending through said opening;
   means for rotating said reel means in said winding direction comprising a pawl connected to said top portion for pivotal movement therewith, said pawl engaging said teeth to rotate said reel means in said winding direction when said top portion is pivoted from an open position toward a closed position relative to said bottom portion; and, means for locking said reel means against rotation in said unwinding direction comprising said pawl, said pawl engaging said teeth in said closed position to lock said reel means against rotation in said unwinding direction;

wherein said bottom portion includes guard means surrounding said opening and said strap means extending therethrough, said guard means extending into said space when said support means rests on said cover and said surface.

16. A device for locking a cover for a compartment relative to a fixed surface, said cover and fixed surface having adjacent spaced apart portions having outer and inner sides relative to said compartment, said device comprising:

support means adapted to sit on said outer sides of said portions of said cover and said surface over the space therebetween, said support means comprising a bottom portion and a top portion pivotably connected to said bottom portion by hinge means;

strap means attached to said support means and adapted to pass through said space into said compartment, said strap means having an end spaced from said support means;

means for attaching said end of said strap means within said compartment;

lock means comprising: tumbler means mounted on said top and rotatable between a locking and unlocking position; attachment means mounted on said bottom; clasp means mounted on said tumbler means for rotation therewith, said clasp means engaging said attachment means when said tumbler means is in said locking position and disengaging said attachment means when said tumbler means is in said unlocking position;

tensioning means for tensioning said strap means to hold said support means against said outer sides of said portions of said cover and surface, said tensioning means comprising reel means, said reel means including at least one ratchet reel having teeth, said reel means on which said strap means is wound being supported on said bottom portion of said support means for rotation in winding and unwinding directions with respect to said strap means, said bottom portion including an opening therethrough, said strap means extending through said opening;

means for rotating said reel means in said unwinding direction comprising a pawl connected to said top portion for pivotal movement therewith, spring means biasing said pawl toward an engaging position in which said pawl engages said teeth to rotate said at least one ratchet wheel in said winding direction when said top portion is pivoted from an open position to a closed position relative to said bottom portion and said pawl being pivotally displaced with said top portion to a disengaged position relative to said teeth when said top portion is pivoted from said closed to said open position;

means for locking said reel means against rotation in said unwinding direction comprising said pawl, said bawl engaging said teeth in said closed position to lock said reel means against rotation in said unwinding direction; and, wherein said bottom portion includes guard means surrounding said opening, and said strap means extending therethrough, said guard means extending into said space when said support means rests on said cover and said surface.

17. A motor vehicle hood lock for use with a motor vehicle having a chassis, a hood having an inner side and an outer side, a body panel adjacent thereto and a gap between said hood and said panel comprising:

a hollow case including a top half and a bottom half, said bottom half having a slot therein, hinge means connecting said top half and said bottom half for relative pivotal displacement between an open and closed position, said bottom of said case being adapted to sit on a portion of said hood and a portion of said body panel with said slot overlying said gap therebetween;

guard means on said bottom half surrounding said slot and extending into said gap;

reel means rotatably supported within said case for rotation in winding and unwinding directions, said reel means comprising ratchet wheel means having teeth;

a strap attached to said reel means and extending therefrom through said slot in said bottom half of said case and through said guard means, said strap having an outer end spaced from said case;

means attached to said outer end of said strap for attaching said strap end to one of said hood and chassis; and, pawl means attached to said top case half for engaging said teeth of said ratchet wheel means to rotate said wheel means in said winding direction when said top case half is pivoted from said open toward said closed position, and said pawl means engaging said teeth of said ratchet wheel means to prevent said reel means from rotating in said unwinding direction when said top case half is in said closed position.

18. A device according to claim 17 including lock means adapted to releasably secure said top half and said bottom half of said case in said closed position.

19. A device according to claim 18, wherein said lock means comprises tumbler means rotatably attached to said top half of said case for rotation between a locked and unlocked position and having an arm attached thereto, and a retaining element attached to said bottom half of said case, said arm engaging with said retaining element when said tumbler means is in said locked position to releasably secure said top and bottom halves in said closed position.

20. A device according to claim 8, wherein said lock comprises:

a latch member pivotably depending from said top half;

a latch keeper attached to said bottom half to engage said latch member in said closed position of said top and bottom halves;

key operated tumbler means rotatably attached to said top half; and, a cam attached to said tumbler means for rotation therewith and adapted to displace said latch member when said cylinder is rotated.

21. A device according to claim 18, wherein said lock means comprises:

a latch member depending from said top half and pivotable between a latched and unlatched position;

a latch spring biasing said latch member toward said latched position;

a latch keeper attached to said bottom half to engage said latch mender in said closed position of said top and bottom halves;

key operated tumbler means attached to said top half and rotatable between a locked and unlocked position;

a tumbler spring biasing said tumbler means toward said locked position; and, a cam attached to said tumbler means for rotation therewith and adapted to displace said latch member from said latched to said unlatched position when said tumbler is rotated from said locked to said unlocked position.

22. A device for locking a cover for a compartment relative to a fixed surface, said cover and fixed surface having adjacent spaced apart portions having outer and inner sides relative to said compartment, said device comprising:

support means adapted to rest on said outer sides of said portions of said cover and said surface over the space therebetween;

strap means attached to said support means and adapted to pass through said space into said compartment, said strap means having an end spaced from said support means;

guard means on said support means surrounding said strap means and extending into said space when said support means rests on said cover and said surface; and, means for attaching said end of said strap means within said compartment.

* * * * *